United States Patent
Omar

(10) Patent No.: US 9,838,360 B2
(45) Date of Patent: Dec. 5, 2017

(54) DATA TRANSMISSION SECURITY IMPROVEMENTS

(71) Applicant: Omarco Network Solutions Limited, Douglas (GB)

(72) Inventor: Ralph Mahmoud Omar, Douglas (GB)

(73) Assignee: Omarco Network Solutions Limited (GB)

( * ) Notice: Subject to any disclaimer, the term of this patent is extended or adjusted under 35 U.S.C. 154(b) by 0 days.

(21) Appl. No.: 14/812,684

(22) Filed: Jul. 29, 2015

(65) Prior Publication Data
US 2016/0164843 A1   Jun. 9, 2016

Related U.S. Application Data

(63) Continuation of application No. 13/806,385, filed as application No. PCT/IB2011/052799 on Jun. 24, 2011, now abandoned.

(30) Foreign Application Priority Data

Jun. 25, 2010   (GB) .................................. 1010735.7

(51) Int. Cl.
*H04L 9/32*   (2006.01)
*H04L 29/06*   (2006.01)
(Continued)

(52) U.S. Cl.
CPC ......... *H04L 63/0428* (2013.01); *H04L 9/083* (2013.01); *H04L 67/02* (2013.01); *H04L 63/0442* (2013.01); *H04L 63/1441* (2013.01)

(58) Field of Classification Search
CPC ................................................ H04L 63/0428
(Continued)

(56) References Cited

U.S. PATENT DOCUMENTS 7,044,395 B1   5/2006   Davis et al.
7,113,615 B2   9/2006   Rhoads et al.
(Continued)

FOREIGN PATENT DOCUMENTS

CN   101227270       7/2008
CN   101277194 A   10/2008
JP   H4137932 A     5/1992

OTHER PUBLICATIONS

International Search Report corresponding to PCT/IB2011/052799, dated Dec. 2, 2011.

*Primary Examiner* — Morshed Mehedi
*Assistant Examiner* — Khalil Naghdali
(74) *Attorney, Agent, or Firm* — Lerner, David, Littenberg, Krumholz & Mentlik, LLP

(57) ABSTRACT

A method of securely transmitting communication information from a first terminal operating in a first coordinate measurement domain to a second remotely-located terminal operating in a second coordinate measurement domain is described. The method comprises: combining the communication information with extraneous information to create a data signal; determining a value of an identification variable expressed with respect to the first coordinate measurement domain, the identification variable value enabling the location of the communication information concealed within the data signal to be determined; transmitting the data signal and the identification variable value from the first terminal to the second terminal; using a coordinate transform function configured to map coordinate values from the first coordinate measurement domain to the second coordinate measurement domain to calculate a value of the received identification variable expressed with respect to the second coordinate measurement domain; and extracting the information from the received data signal using the calculated
(Continued)

identification variable value to distinguish the communication information from the extraneous information.

22 Claims, 7 Drawing Sheets

(51) Int. Cl.
  *H04L 29/08* (2006.01)
  *H04L 9/08* (2006.01)
(58) Field of Classification Search
  USPC ........................................................ 713/168
  See application file for complete search history.

(56) References Cited

U.S. PATENT DOCUMENTS

| | | |
|---|---|---|
| 7,369,678 B2 | 5/2008 | Rhoads |
| 7,532,741 B2 | 5/2009 | Stach |
| 7,646,882 B2 | 1/2010 | Muratani |
| 7,756,290 B2 | 7/2010 | Rhoads |
| 2001/0033674 A1 | 10/2001 | Chen et al. |
| 2003/0110512 A1 | 6/2003 | Maari |
| 2004/0098348 A1* | 5/2004 | Kawasaki ............... G06F 21/10 705/59 |
| 2004/0240588 A1 | 12/2004 | Miller |
| 2004/0242201 A1 | 12/2004 | Sasakura et al. |
| 2005/0110512 A1 | 5/2005 | Berman et al. |
| 2008/0279287 A1* | 11/2008 | Asahina ................... H04B 1/69 375/242 |
| 2010/0293106 A1 | 11/2010 | Rhoads et al. |

* cited by examiner

DATA TRANSMISSION SECURITY IMPROVEMENTS

CROSS-REFERENCE TO RELATED APPLICATIONS

The present application is a continuation, of U.S. patent application Ser. No. 13/806,385, filed Jan. 31, 2013, which application is a national phase entry under 35 U.S.C. §371 of International Application No. PCT/IB2011/052799, filed Jun. 24, 2011, which claims priority from G.B. Application No. 1010735.7, filed Jun. 25, 2010, all of which are hereby incorporated herein by reference.

TECHNICAL FIELD

The present invention relates to the field of secure data transmission and in particular to an improved steganographic method of securely transmitting data between remotely located parties.

BACKGROUND OF THE INVENTION

The ability to securely transfer data between remotely located terminals is a necessary requirement for many present day applications, in particular where the data being transferred is confidential, such as in electronic transactions of financial and/or other confidential data between remotely located terminals.

Cryptography is one known way of securely transmitting information. Conventionally, a signal comprising the confidential information is encrypted at a sending device using an encryption key, which encrypts the information in accordance with a selected algorithm. The encrypted signal comprising the encrypted information is subsequently transmitted to a receiving device. To recover the encrypted information a decryption key is used at the receiving device.

The security of known cryptographic protocols often resides in the computational complexity required to derive the decryption key. In practice, the computational complexity required to crack a cryptographic protocol often means that several hours, if not days are required to crack the protocol! However, the increasing complexity of the applied encryption algorithms has the converse undesired effect of increasing the computational power required at the receiving end, to carry out decryption. Increasingly sophisticated specialised hardware is required to provide such robust levels of security.

In real world cryptographic applications, often the level of security is sacrificed, in favour of minimising implementation costs. In such applications, the cost saving of using lower level security protocols is perceived as justifying the decrease in afforded security. This is particularly true in relatively low-cost transmission systems, such as networked lottery ticket issuing terminals, where the value of the lottery ticket itself and the associated hardware do not justify investing in state of the art cryptographic systems. As a result, often such systems are relatively insecure.

A further shortcoming associated with known cryptographic systems, is that the presence of encrypted data itself, may be sufficient to alert and attract the unwanted attention of a malevolent third party. After all, only sensitive and confidential information tends to be encrypted. Thus, in effect whilst cryptography can be very successful in maintaining the confidentiality of sensitive information in transit, it can also alert a malevolent third party to the existence of such data in the first instance.

Steganography provides a known way of overcoming the afore described shortcoming associated with known cryptographic protocols. Effectively, steganography is the art and science of writing hidden messages in such a way that no one, apart from the sender and intended recipient, suspects the existence of the message, a form of security through obscurity. Often this is achieved by hiding a confidential message within a "carrier" message. The carrier message effectively disguises the confidential message. In this way, the steganographic message does not attract the unwanted interest of malevolent third parties.

In practice, steganographic messages are commonly comprised of a carrier file, within which the confidential information is disguised. For example, often text files, such as PDF files are used as the carrier, and the confidential information is disguised within the text of the file in accordance with an algorithm. The more complex the algorithm the greater the provided security. However, this improved security requires increased processing capabilities at both the sender and the receiver, which inevitably increases the costs of the required hardware.

It is clear that there is a need for improved secure transmission methods for use in low-cost applications, and it is an object of the present invention to provide an improved, secure transmission system and method which is simple to implement, at relatively low cost, and does not suffer the shortcomings of the prior art systems.

SUMMARY OF THE INVENTION

A first aspect of the present invention relates to a method of securely transmitting communication information from a first terminal operating in a first coordinate measurement domain to a second remotely-located terminal operating in a second coordinate measurement domain. The method comprises combining the communication information with extraneous information to create a data signal, and determining a value of an identification variable expressed with respect to the first coordinate measurement domain. The identification variable value enables the location of the communication information concealed within the data signal to be determined. The data signal and the identification variable value are transmitted from the first terminal to the second terminal. A coordinate transform function configured to map coordinate values from the first coordinate measurement domain to the second coordinate measurement domain is used to calculate a value of the received identification variable expressed with respect to the second coordinate measurement domain. The information is extracted from the received data signal using the calculated identification variable value to distinguish the communication information from the extraneous information.

An advantage of the present invention is that it provides a convenient, effective and relatively simple method of concealing communication information within extraneous information and securely transferring the combined information within a data signal. Implementation of the present method does not require special hardware and may be carried out using commonly available components at relatively low cost. This contrasts with other known secure transmission methods where special apparatus is often required. Furthermore, the concealed communication may be recovered at the receiving terminal relatively quickly once the identification variable value has been expressed with respect to the receiving terminal's coordinate measurement domain. Accordingly, the present method is particularly suitable for use in applications where large volumes of information need to transmitted securely, and information recovery times minimised.

The present method is particularly effective in protecting against intercept-resend type attacks (e.g. eavesdropping). An eavesdropper cannot accurately extract the communication information from the data signal without knowing the coordinate measurement domain with respect to which the identification variable value is expressed. Provided that this information is maintained confidential, an eavesdropper cannot accurately distinguish between extraneous information and communication information (i.e. the information that the sending terminal wishes to securely transmit to the receiving terminal).

In alternative embodiments, the first terminal may be provided with the coordinate transform function and is arranged to carry out the using step prior to the transmitting step. This reduces the processing requirements of the receiving terminal (the second terminal) even further, since the act of calculating the identification variable value expressed with respect to the second coordinate measurement domain is carried out by the first terminal. Accordingly, on receipt of the data signal, the second terminal simply uses the re-expressed identification variable value to recover the communication information. The processing requirements of the receiving terminal are thus advantageously further minimised.

Alternatively, the communication information is transmitted to a second receiving terminal operating in a second coordinate measurement domain and to a third receiving terminal operating in a third coordinate measurement domain. The using step comprises calculating a value of the identification variable expressed with respect to the second coordinate measurement domain, and with respect to the third coordinate measurement domain.

In such embodiments the identification variable may comprise a receiving terminal identifier, the identifier being indicative of the receiving terminal coordinate measurement domain the identification variable value is expressed with respect to. At each receiving terminal, the extracting step may comprise identifying the identification variable value expressed with respect to the receiving terminal's coordinate measurement domain on the basis of the terminal identifier. Subsequently using the identification variable value to extract the communication information from the received data signal.

The identifier provides each receiving terminal with a simple means for readily identifying the identification variable value that is expressed with respect to its adopted coordinate measurement domain.

Additionally, the data signal may comprise first and second communication information, and the extracting step further comprises: extracting the first communication information at the second receiving terminal using a first identification variable value calculated in the using step, the first identification variable value having been identified on the basis of a first identifier; and extracting the second communication information at the third receiving terminal using a second identification variable value calculated in the using step, the second identification variable value having been identified on the basis of a second identifier.

An advantage of such embodiments, is that different communication information may be securely transmitted to different receiving terminals via a single data signal, which is received by each one of the different receiving terminals. Each terminal is only able to extract the communication information whose location is determinable from the received identification variable value expressed with respect to the coordinate measurement domain of the subject terminal. This ensures that only the receiving terminal's intended recipient is able to extract the communication information, and avoids the need for creating a separate data signal for each intended recipient terminal.

Effectively, the method of the present invention may be used to securely transmit communication information to a plurality of different receiving terminals using a single data signal.

In alternative embodiments the transmitting step comprises transmitting the identification variable value from the first terminal to the second terminal via a third terminal.

For example, the third terminal may be provided with the coordinate transform function, and the method further comprises: encrypting, at the first terminal, the identification variable value using a first cryptographic key shared with the third terminal, and transmitting the encrypted identification variable to the third terminal; decrypting, at the third terminal, the received encrypted identification variable prior to carrying out the using step; and encrypting the identification variable value expressed with respect to the second coordinate measurement domain, using a second cryptographic key shared with the second terminal, and transmitting the encrypted identification variable to the second terminal for carrying out the extracting step.

An advantage of such embodiments is that neither the first or second terminal are required to carry out any identification variable value calculations. Furthermore, neither of the terminals possess the coordinate transform function. Therefore, even if the integrity of one of the terminals is compromised by a malevolent third party, the malevolent third party, the transmission protocol itself is not compromised. In other words, the malevolent third party may be able to recover the confidential information by posing as a genuine receiver using the compromised terminal, however the confidentiality of the sender's coordinate measurement domain is still maintained, and can continue to be used.

A second aspect of the present invention relates to a system arranged to carry out the above described method, and specifically to a system arranged for securely transmitting communication information from a first terminal operating in a first coordinate measurement domain to a second remotely-located terminal operating in a second coordinate measurement domain. The system comprises: combining means, provided at the first terminal, for combining the communication information with extraneous information to create a data signal; determining means provided at the first terminal, for determining a value of an identification variable expressed with respect to the first coordinate measurement domain, the identification variable value enabling the location of the communication information concealed within the data signal to be determined; a transmitter for transmitting the data signal and the identification variable value from the first terminal to the second terminal; a mapping means provided at the second terminal, for using a coordinate transform function configured to map coordinate values from the first coordinate measurement domain to the second coordinate measurement domain to calculate a value of the received identification variable expressed with respect to the second coordinate measurement domain; and extracting means, provided at the second terminal, for extracting the information from the received data signal using the calculated identification variable value to distinguish the communication information from the extraneous information.

Further features and advantages of the present invention are set out in the following clauses:

1. A method of securely transmitting communication information from a first terminal operating in a first coordinate measurement domain to a second remotely-located terminal operating in a second coordinate measurement domain, the method comprising: combining the communication information with extraneous information to create a data signal; determining a value of an identification variable expressed with respect to the first coordinate measurement domain, the identification variable value enabling the location of the communication information concealed within the data signal to be determined; transmitting the data signal and the identification variable value from the first terminal to the second terminal; using a coordinate transform function configured to map coordinate values from the first coordinate measurement domain to the second coordinate measurement domain to calculate a value of the received identification variable expressed with respect to the second coordinate measurement domain; and extracting the information from the received data signal using the calculated identification variable value to distinguish the communication information from the extraneous information.

2. The method of clause 1, wherein the first terminal is provided with the coordinate transform function and is arranged to carry out the using step prior to the transmitting step.

3. The method of clause 2, wherein communication information is transmitted to a second receiving terminal operating in a second coordinate measurement domain and to a third receiving terminal operating in a third coordinate measurement domain, and the using step comprises calculating a value of the identification variable expressed with respect to the second coordinate measurement domain, and with respect to the third coordinate measurement domain.

4. The method of clause 3, wherein the identification variable comprises a receiving terminal identifier, the identifier being indicative of the receiving terminal coordinate measurement domain the identification variable value is expressed with respect to.

5. The method of clause 4, wherein at each receiving terminal the extracting step comprises identifying the identification variable value expressed with respect to the receiving terminal's coordinate measurement domain using the terminal identifier, and using the identification variable value to extract the information from the received data signal.

6. The method of clause 5, wherein the data signal comprises first and second communication information, and the extracting step further comprises: extracting the first communication information at the second receiving terminal using a first identification variable value calculated in the using step, the first identification variable value having been identified on the basis of a first identifier; and extracting the second communication information at the third receiving terminal using a second identification variable value calculated in the using step, the second identification variable value having been identified on the basis of a second identifier.

7. The method of clause 1, wherein the transmitting step comprises transmitting the identification variable value from the first terminal to the second terminal via a third terminal.

8. The method of clause 7, wherein the third terminal is provided with the coordinate transform function, the method further comprising: encrypting, at the first terminal, the identification variable value using a first cryptographic key shared with the third terminal, and transmitting the encrypted identification variable to the third terminal; decrypting, at the third terminal, the received encrypted identification variable prior to carrying out the using step; and encrypting the identification variable value expressed with respect to the second coordinate measurement domain, using a second cryptographic key shared with the second terminal, and transmitting the encrypted identification variable to the second terminal for carrying out the extracting step.

9. The method of clause 8, wherein the extracting step comprises decrypting, at the second terminal, the received encrypted identification variable value using the second cryptographic key, and using the decrypted identification variable value to distinguish the communication information from the extraneous information.

10. The method of clause 8 or clause 9, wherein the data signal and the identification variable value are transmitted separately.

11. The method of clause 8 or clause 9, wherein the data signal and the identification variable value are transmitted simultaneously.

12. The method of clause 10 or clause 11, wherein the data signal is transmitted from the first terminal directly to the second terminal.

13. The method of any of clauses 8 to 12, wherein the first and second cryptographic keys are different public key pairs.

14. The method of any one of clauses 1 to 13, wherein the coordinate measurement domains associated with the different terminals, relate respectively to different Lorentzian coordinate frames of reference.

15. The method of any one of clauses 1 to 14, wherein the identification variable is a time variable.

16. The method of any one of clauses 1 to 15, wherein the first and second coordinate measurement domains are the same coordinate measurement domain, and the using step is omitted.

17. The method of any preceding clause, wherein the combining step comprises combining the communication information with the extraneous information in accordance with an algorithm.

18. The method of clause 17, wherein the algorithm is randomly generated.

19. The method of clause 17 or clause 18, wherein the identification variable value comprises the algorithm.

20. A system for securely transmitting communication information from a first terminal operating in a first coordinate measurement domain to a second remotely-located terminal operating in a second coordinate measurement domain, the system comprising: combining means, provided at the first terminal, for combining the communication information with extraneous information to create a data signal; determining means provided at the first terminal, for determining a value of an identification variable expressed with respect to the first coordinate measurement domain, the identification variable value enabling the location of the communication information concealed within the data signal to be determined; a transmitter for transmitting the data signal and the identification variable value from the first terminal to the second terminal; a mapping means provided at the second terminal, for using a coordinate transform function configured to map coordinate values from the first coordinate measurement domain to the second coordinate measurement domain to calculate a value of the received identification variable expressed with respect to the second coordinate measurement domain; and extracting means, provided at the second terminal, for extracting the information from the received data signal using the calculated identification variable value to distinguish the communication information from the extraneous information.

21. The system of clause 20, wherein the first terminal is provided with the mapping means and is arranged to calculate a value of the identification variable expressed with respect to the second coordinate measurement domain.

22. The system of clause 21, comprising a third receiving terminal operating in a third coordinate measurement domain, and the mapping means is arranged to calculate a value of the identification variable expressed with respect to the third coordinate measurement domain.

23. The system of clause 22, wherein each one of the second and third terminals comprise means for identifying the identification variable value expressed in its own coordinate measurement domain on the basis of a terminal identifier associated to the identification variable value, the identifier being indicative of the terminal coordinate measurement domain the identification variable value is expressed with respect to.

24. The system of clause 23, wherein each receiving terminal comprises extracting means for using the identification variable value to extract the information from the received data signal using the identification variable value to distinguish the communication information from the extraneous information.

25. The system of clause 20, wherein the transmitter is arranged to transmit the identification variable value from the first terminal to the second terminal via a third terminal.

26. The system of clause 25, wherein the third terminal is provided with the mapping means, the system further comprising: first encrypting means, provided at the first terminal, for encrypting the identification variable value using a first cryptographic key shared by the first terminal with the third terminal; decrypting means, provided at the third terminal, for decrypting the received encrypted identification variable using the shared first cryptographic key; second encrypting means, provided at the third terminal for encrypting the identification variable value expressed with respect to the second coordinate measurement domain, using a second cryptographic key shared with the second terminal; and second transmitting means, provided at the third terminal, for transmitting the encrypted identification variable to the second terminal.

27. The system of clause 26, wherein the second terminal is provided with third decrypting means, for decrypting the received encrypted identification variable value using the second cryptographic key.

28. A data terminal for securely transmitting communication information to a remotely located second terminal, the data terminal comprising: combining means, for combining the communication information with extraneous information to create a data signal; determining means, for determining a value of an identification variable expressed with respect to a first coordinate measurement domain, the identification variable value enabling the location of the communication information concealed within the data signal to be determined; and a transmitter for transmitting the data signal and the identification variable value to the second terminal.

29. A data terminal for securely receiving communication information from a remotely located transmitting terminal, the data terminal comprising: a receiver, for receiving a data signal comprising the communication information combined with extraneous information, and for receiving a value of an identification variable enabling the location of the communication information within the data signal to be determined; and a demodulator, for extracting the combined communication and extraneous information from the received data signal.

30. The data terminal of clause 28 or clause 29, wherein the data terminal is a computer terminal.

31. The data terminal of clause 28 or clause 29, wherein the data terminal is a mobile telephone.

32. The data terminal of clause 28 or clause 29, wherein the data terminal is a smartphone.

Further features and advantages of the present invention are set out in the ensuing description and claims.

DETAILED DESCRIPTION OF THE INVENTION

A more detailed description of specific embodiments of the present invention is set out below with reference to the above-described figures.

Figure 1:
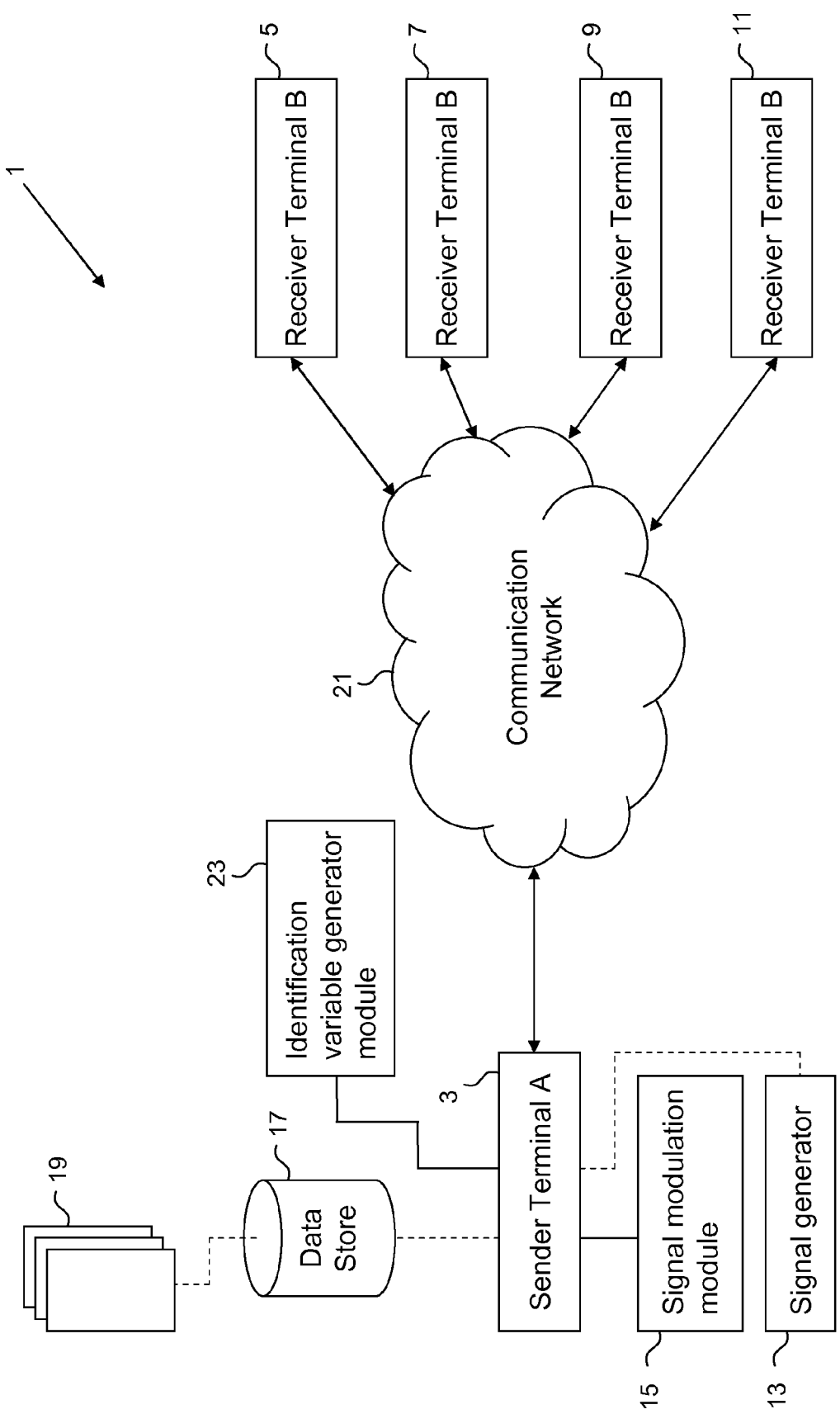
FIG. 1 is a schematic overview of a system for transmitting a secure data signal from a sender terminal to one or more recipient terminals.

FIG. 1 is a schematic overview of a system 1 for transmitting a secure data signal comprising confidential communication information combined with extraneous information—the communication information is effectively concealed within the extraneous information. The data signal is transmitted from a sender to one or more recipient's in accordance with an embodiment of the present invention. The system 1 comprises a sender terminal 3 and one or more receiver terminals 5, 7, 9, 11. The sender terminal 3 (also referred to as terminal A in the ensuing description) may further comprise a signal generator 13, arranged to generate a carrier signal; a signal modulation module 15 for modulating a selected signal; and a data store 17. The data store 17 comprises a plurality of data 19 associated with communication information and extraneous information. The communication information is information that a user located at the sender terminal 3 wishes to securely transmit to one or more of the selected receiver terminals 5, 7, 9, 11. The extraneous information provides a means for concealing the communication information, and relates to authentic information. The extraneous information may relate to any type of information. For example, in some embodiments the extraneous information may relate to a graphical image, or to a moving image (e.g. a video). Other types of information may also be used, the provided example is non-limiting, and such alternatives fall within the scope of the present invention.

The data signal is generated at the sender terminal 3 and comprises the user selected communication information combined with the extraneous information, as mentioned previously. The data signal itself may be generated by modulating a carrier signal generated by the signal generator 13 with the combined information, using the signal modulation module 15. It is envisaged that any known modulation method may be used.

The data signal is subsequently sent to one or more user nominated receiver terminals 5, 7, 9, 11 via a shared communication channel. In certain embodiments, the communication channel may relate to a communication network 21 such as the internet, or alternatively to a private communication network.

In addition to sending the data signal to one or more selected receiver terminals 5, 7, 9, 11, the sender terminal 3 also sends data associated with an identification variable value, which may be generated by an identification variable generator module 23 operatively connected to the sender terminal 3, to the one or more user nominated receiver terminals 5, 7, 9, 11. The identification variable generator module 23 is arranged to determine the value of an identification variable associated with the location of the communication information concealed within the data signal. The functionality of the identification variable generator module 23 my be provided by processing means local to the sender terminal 3. The identification variable enables a receiver to extract the concealed user selected data from the data signal. Upon receipt of the data signal and the identification variable value, the one or more user nominated receiver terminals 5, 7, 9, 11 use the received identification variable value to extract the concealed communication information from the received data signal.

The identification variable value is expressed with respect to a confidential measurement domain (also interchangeably referred to as a measurement frame in the ensuing description) unknown to third parties. This requirement may be implemented in several different ways, preferred embodiments of which are described herein. For present purposes, it suffices to note that the security of the system is dependent on the confidentiality of the measurement frame with respect to which the identification variable value is expressed. In the absence of this information, an eavesdropper cannot accurately extract the confidential communication information from the intercepted data signal—knowledge of the identification variable value alone is useless, since the eavesdropper cannot interpret it. In other words, knowledge of a coordinate value in itself does not convey any information without knowledge of the coordinate frame with respect to which it is expressed. Accordingly, to accurately extract the communication information from the data signal both the identification variable value and the coordinate measurement domain with respect to which the variable value is expressed must be known. In the absence of either one of these two pieces of information, an eavesdropper cannot extract the communication information. Further details of this feature of the present invention are set out below.

The data signal may be generated by populating the carrier signal, with both extraneous and confidential communication information prior to transmission, as mentioned previously. The data signal may relate to either an analogue or a digital signal, and may relate to a data packet.

In certain embodiments, the confidential communication information is combined and concealed within extraneous information in accordance with a selected encoding algorithm. This combining step may be carried out at the sender terminal 3, using the local processing capabilities of the terminal 3. Alternatively, the combining step may equally be carried out by an alternative processing device operatively connected to the terminal 3. The combining step may comprise, for example, encoding the binary sequence associated with the confidential communication information within the binary sequence associated with the extraneous information, in accordance with a selected encoding algorithm to generate a resulting transmission binary sequence. A carrier signal may subsequently be modulated with the resulting transmission binary sequence to form the transmission data signal, which comprises both the confidential and the extraneous information. As mentioned previously, the transmission data signal is subsequently sent via the shared communication channel, to one or more intended recipients. The one or more identification variable values may be sent to the intended recipients simultaneously with the transmission signal, or separately.

To distinguish the confidential communication information from the extraneous information in the received transmission signal, the one or more receivers must be able to interpret the received identification variable value. In other words, the recipients must be able to express the identification variable value within a known coordinate measurement domain. Provided that the coordinate measurement domain with respect to which the identification variable value is being expressed is unknown to an eavesdropper, or any other non-authorised malevolent third parties, then the eavesdropper and/or third parties will not be able to extract the confidential communication information from the intercepted data signal, even when in possession of the identification variable values.

On receipt of the transmitted data signal, the confidential communication information is extracted by the intended recipient (e.g. any one of terminals 5, 7, 9, 11), using the received one or more identification variable values to distinguish the confidential communication information from the extraneous information comprised within the data signal. In embodiments where sender and receiver do not adopt the same measurement reference system, conversion of the received one or more identification variable values into the measurement reference system of the recipient is required. The identification variable values may either be converted by the sender prior to transmission, or by the receiver on receipt of the transmitted data signal, to values expressed with respect to the recipient's adopted coordinate measurement domain. This is analogues to performing a coordinate transform between the two different coordinate measurement domains adopted respectively by the sender and the receiver.

In embodiments where the transmitted identification variable values are expressed with respect to the sender's adopted coordinate measurement domain, the receiver must be in possession of the correct transform function, mapping variable values expressed with respect to the sender's adopted coordinate measurement domain to variable values expressed with respect to the receiver's coordinate measurement domain. In this way, the receiver is able to map the received variable values from values expressed with respect to the sender's coordinate measurement domain, to variable values expressed with respect to the receiver's coordinate measurement domain. This ability to convert and to re-express received identification variable values in the receiver's coordinate measurement domain, enables the receiver to distinguish between extraneous and confidential communication information, and to extract the confidential communication information from the received data signal.

Alternatively, the transmitted identification variable values may be expressed with respect to the receiver's coordinate measurement frame. In such embodiments, the receiver is not required to perform any coordinate transform operation on the received information variable values, since the variable values are already expressed with respect to the receiver's coordinate measurement frame. Instead, the mapping function is carried out by the sender prior to transmission of the one or more identification variable values. Accordingly, the sender must possess the coordinate mapping function, enabling the sender to convert identification variable values expressed with respect to the sender's measurement coordinate frame to variable values expressed with respect to the receiver's measurement coordinate frame.

The security of the present system and method will become clearer from the ensuing description.

Figure 2:
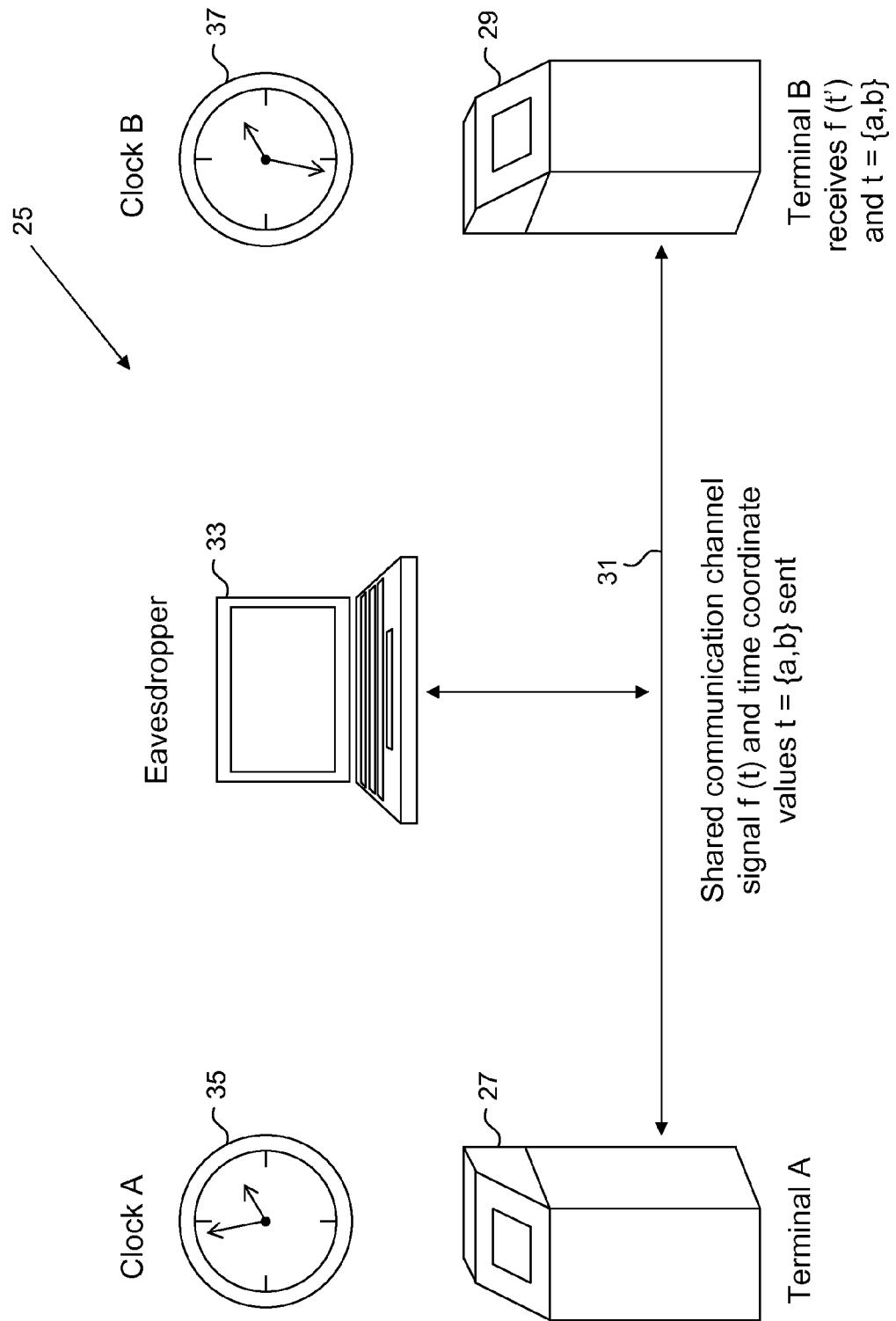
FIG. 2 is a simplified schematic of the transmission system of FIG. 1 comprising a sending terminal, a single receiving terminal, and an eavesdropper, and is incorporated herein to illustrate the security of the present transmission method from eavesdroppers.

FIG. 2 is a simplified schematic diagram of a transmission system 25 incorporated herein to facilitate the reader's understanding of the system and method of the present invention, and to highlight the security of the invention. The system 25 comprises a sending terminal 27—terminal A—and, a receiving terminal 29—terminal B, arranged to communicate via the shared communication channel 31. The integrity of the shared communication channel 31 has been compromised by an eavesdropper 33, who is able to intercept all communication signals sent between the terminals 27, 29 via the shared channel 31.

In a preferred embodiment, the identification variable may relate to a time variable, and defines the location of the confidential communication information concealed within the transmission signal. Clocks A 35 and B 37 represent respectively terminal A's 27 adopted coordinate measurement frame, and to terminal B's 29 adopted coordinate measurement frame.

Figure 3A:
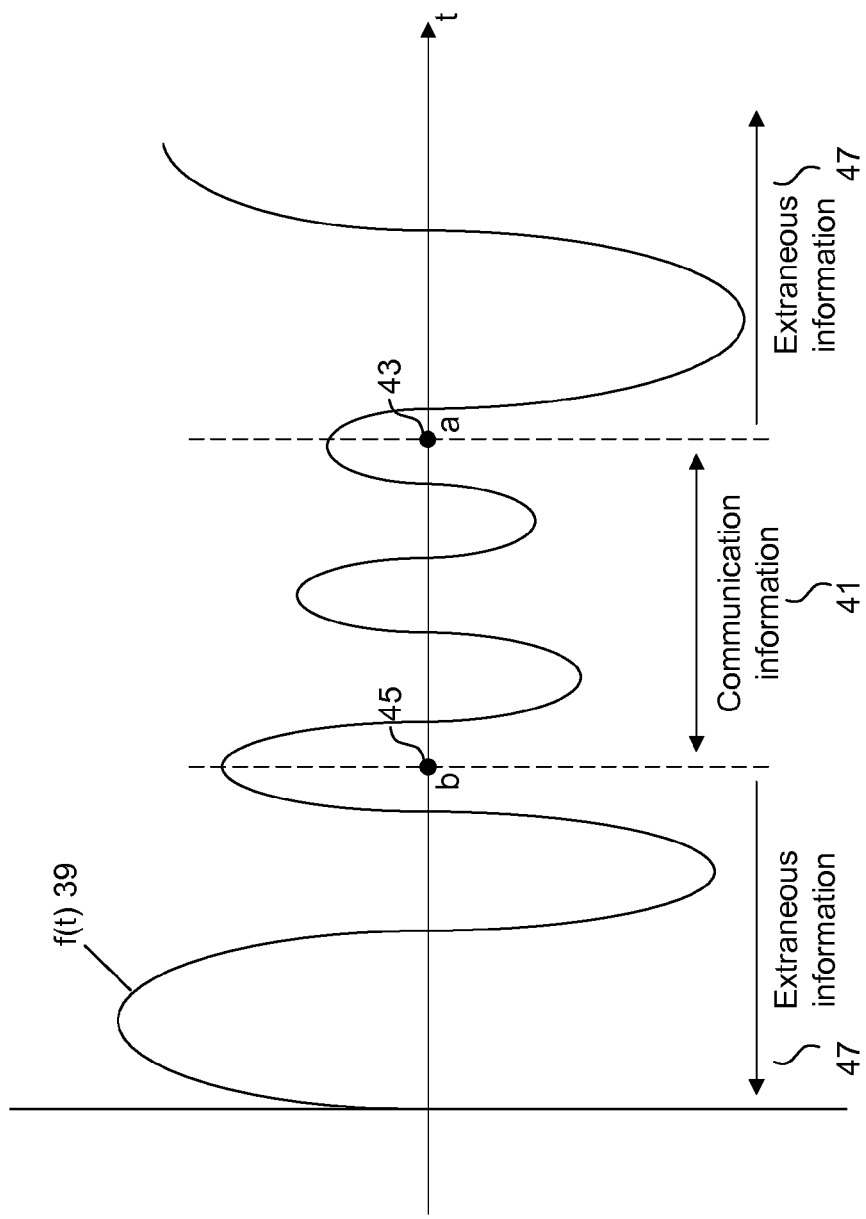
FIG. 3a is an example of a transmission signal comprising concealed confidential communication information as prepared by terminal A illustrated in FIG. 2.

FIG. 3a is an example illustrating an arbitrary transmission data signal f(t) 39 expressed as a function of time in terminal A's 27 selected coordinate measurement frame. The confidential communication information 41 is defined as being comprised in the region b t a, where t is the time-variable, and a 43 and b 45 refer to the maximum and minimum values of t.

All information falling outside the defined range of values of t relates to extraneous information 47. It is important to note that the term "extraneous information" is used in the present description to describe information which does not relate to the information the sender wishes to send to the intended receiver, and is comprised within the transmission signal solely as a means of concealing the confidential communication information 41. The extraneous information 47 may relate to valid data, or could be false information specifically created by the sender (i.e. terminal A 27) to mislead the eavesdropper 33. For example, the extraneous information 47 may be noise. Alternatively, the extraneous information 47 may relate to text, video, audio, or any other type of information. Accordingly, if an eavesdropper 33 intercepts the transmission signal 39 and attempts to extract the information comprised within the signal, it is highly likely that the eavesdropper 33 will mistakenly identify the extraneous information 47 for the confidential communication information 41. As mentioned previously, both the confidential communication information 41 and the extraneous information 47 may be encoded within the carrier signal using modulation techniques known in the art. The transmission signal f(t) 39 along with the identification variable values t={a,b} 43, 45 are sent via the shared communications channel 31 to the recipient—terminal B 29. In the illustrated embodiment, the identification variable values t={a,b} 43, 45 relate to boundary values defining a region of the data signal f(t) 39, which relates to the communication information 41. It is to be appreciated that this embodiment is provided for illustrative purposes and is not limiting. Alternative ways of combining the communication information 41 with the extraneous information 47 are envisaged, which may result in the communication information 41 being randomly dispersed within the resulting data signal 39, in which case the identification variable values may relate to discrete points and/or a plurality of ranges of values.

Figure 3B:
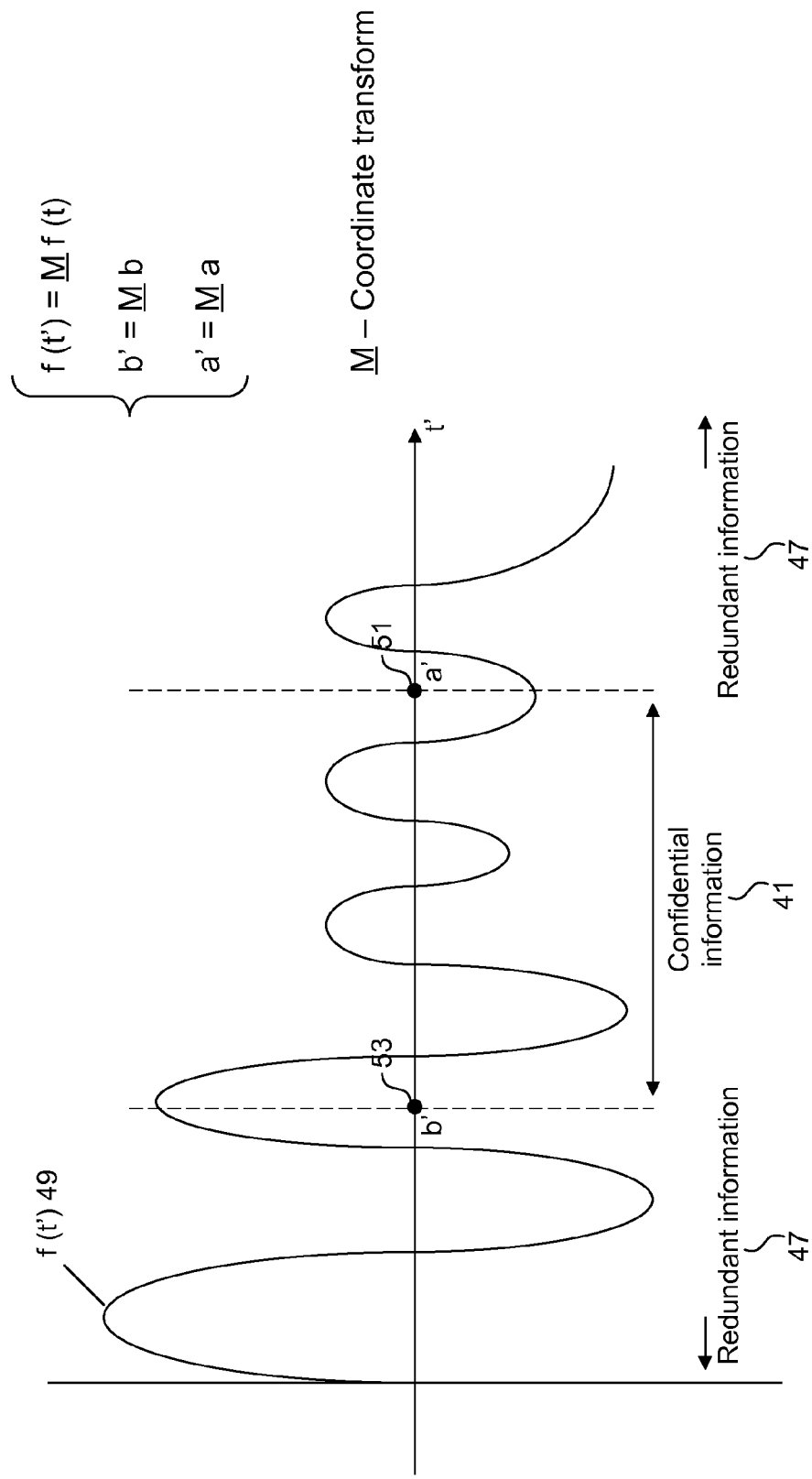
FIG. 3b is an example of the transmission signal of FIG. 3a as received by terminal B illustrated in FIG. 2, and measured with respect to terminal B's adopted measurement frame.

FIG. 3b is an example of the transmission signal f(t') 49 received by the recipient—terminal B 29. Terminal B 29 receives transmission signal f(t') 49 measured in its nominated coordinate measurement frame (the time frame represented by clock B 37), and time-variable boundary values t={a,b} 43, 45 expressed with respect to terminal A's coordinate frame (the time frame represented by clock A 35). Ignoring attenuation and other signal deformation effects resulting from propagation in the shared communication channel 31, it is important to note that in the present embodiment the received transmission signal f(t') 49 will differ from the sent transmission signal f(t) 39, since the terminals A 27, B 29 are measuring the data signal in different coordinate measurement frames 35, 37.

Transmission signal degradation effects in both the amplitude and frequency domain resulting from transmission in the shared communication channel 31, for example, signal attenuation and pulse broadening, may be corrected using known techniques and/or apparatus. For example, signal repeaters may be used to mitigate attenuation effects. The present invention may be used in accordance with any known method and/or system for mitigating against signal deformation effects resulting from transmission along the shared communication channel 31.

Extraction of the confidential communication information 41 from the received data signal f(t') 49, requires expressing the received time-variable values a 43 and b 45, in terminal B's 29 coordinate measurement frame 37—i.e. the value t'={a',b'} 51, 53 are required. The relationship between the time-variable values as measured in terminal B's 29 coordinate frame (i.e. t'={a',b'} 51, 53) and terminal A's 27 coordinate frame (i.e. t={a,b} 43, 45) are:

$$a' = \underline{M}a$$

$$b' = \underline{M}b$$

Where M is a coordinate transform function, which maps between points in terminal A's (i.e. the sender) coordinate frame 35, and terminal B's coordinate frame 37 (i.e. receiver). a' 51 is the projection of the coordinate value a 43 expressed with respect to terminal B's coordinate frame 37. In other words, a' 51 is the value of a 43 expressed with respect to terminal B's coordinate frame 37. Similarly, b' 53 is the projection of coordinate value b 45 expressed with respect to terminal B's coordinate frame 37. As mentioned previously, in the present embodiment the coordinate transform function M, is known only to terminal B 29 (the recipient).

In some embodiments the coordinate transform function M may also comprise a correction factor to compensate for any attenuation and/or signal degradation in the amplitude, and/or frequency domain, arising during transmission in the shared communication channel 31.

In some embodiments, the sender (i.e. terminal A 27) may send several identical copies of the data signal f(t) 39 to the receiver (i.e. terminal B 29). The copies may be sent in temporal succession, or at random discrete temporal intervals. Once the copies of the transmission signal have been received, the receiver can faithfully reconstruct the transmission signal. In this way any transmission errors resulting from non-faithful signal transmission, can be mitigated.

The identification variable may relate to any physically measurable variable and/or observable associated with the data signal, and need not necessarily relate to a time variable. For example, the data signal may equally be expressed in the frequency domain, in which case the identification variable value may relate to a frequency value. Alternative embodiments are envisaged where any physically measurable variable and/or observable associated with the data signal may be used as the identification variable. Since such measurable variables and/or observables will be known to the reader skilled in the art of signal processing, a detailed list of all possible variables and/or observables is superfluous.

In an alternative embodiment the confidential communication information may be encoded within a digital image file which is subsequently sent to the intended receiver. The identification variable may relate to pixel location information. For example, the confidential communication information may be encoded in every tenth pixel value. The sender provides the receiver with the identification variable values, which in this specific embodiment relate to pixel location values expressed in the sender's selected measurement frame, or alternatively to an algorithm enabling the location of each required pixel to be determined. For example, the algorithm may effectively relate to a series (e.g.

$$f(x) = \sum_{x=a}^{b} 10x,$$

where a and b delimit the range of pixels in which the communication information is concealed), wherein each tenth pixel represents a component of the communication information. On receipt, the receiver converts the received pixel location values to coordinate location values expressed in the receiver's selected coordinate measurement domain, as previously described.

Figure 4:
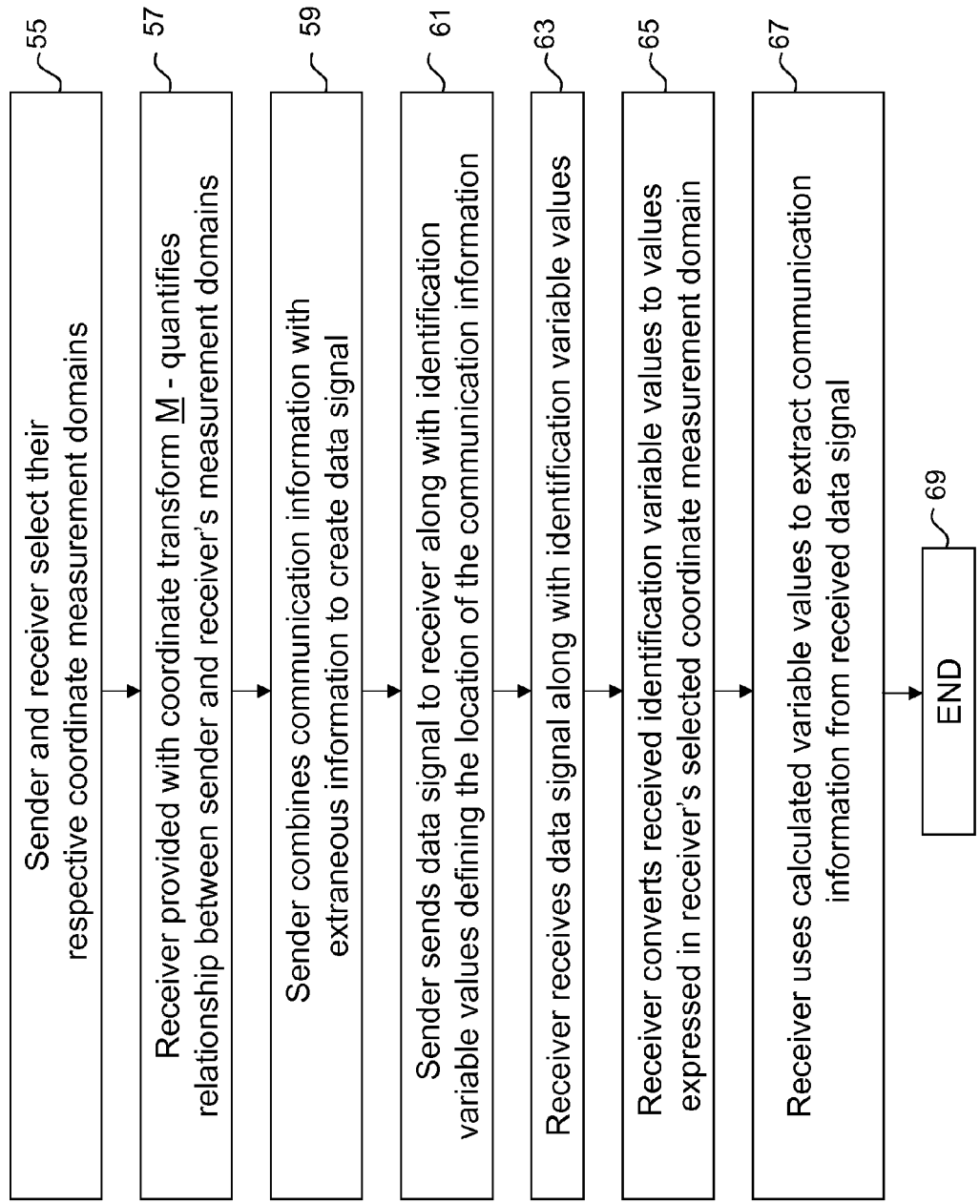
FIG. 4 is a process flow chart of the steps comprised in the method carried out by the apparatus of FIG. 2.

FIG. 4 is a high level process flow chart, illustrating the different steps comprised in the afore described method, and highlights how information may be securely transmitted between remotely located terminals sharing a communication channel, as illustrated in FIG. 2. In step 55 the sending terminal (i.e. terminal A 27) and the receiving terminal (i.e. terminal B 29) select their coordinate measurement domains. All the embodiments described so far comprised the sender and receiver selecting different measurement frames. However, embodiments wherein both sender and receiver select the same measurement frame are equally possible and are described in further detail in the alternative embodiment section below. It is to be noted that it is not a general requirement that sender and receiver adopt different coordinate measurement domains, provided that the adopted measurement domain is unknown to an eavesdropper 33 and/or any other malevolent third parties. Preferably, the measurement frames are selected and defined at the point of manufacture of terminals A 27 and B 29 in order to avoid transmitting sensitive information over a potentially compromised communication channel, which if intercepted could compromise the integrity of the transmission system.

Returning to FIG. 4, in step 57 the receiving terminal—terminal B 29—is provided with the coordinate transform function M, which maps points in terminal A's 27 selected coordinate measurement frame to points in terminal B's 29 selected coordinate measurement frame. For example, this may comprise terminal B 29 being provided with information regarding terminal A's 27 selected coordinate measurement frame, such that the coordinate transform function M can be determined. The transform function M may alternatively be simply provided to terminal B 29 during configuration at the point of manufacture. Alternatively, terminal A 27 may be provided with the transform function M to enable terminal A 27 to transmit the identification variable values expressed with respect to terminal B's 29 adopted coordinate measurement domain. This initial configuration is preferably carried out at the point of manufacture. Alternatively, the coordinate transform function M may be provided to either terminal A 27 or terminal B 29 by transmission via a known secure channel. In other words, the coordinate transform function M may be transmitted to either terminal A 27 or terminal B 29 from a secure source via a secure channel that is known not to be compromised.

Following this initial configuration, terminals A 27 and B 29 may be used for secure data transmission. In step 59 terminal A encodes the confidential communication information in a transmission signal comprising extraneous information, as previously described. This encoding may be carried out in accordance with a selected encoding algorithm, a selected steganographic algorithm, and/or any selected data embedding security schemes. For example, such an algorithm may result in confidential communication information being interspersed at irregular intervals within the data signal. Equally, the confidential data may be dispersed at regular intervals within the data signal. The precise nature of the employed encoding algorithm is not critical to the present embodiment, and such algorithms and/or schemes are widely known in the art, and accordingly are not discussed further. The interested reader is referred to any textbook regarding steganographic encoding algorithms, and/or data embedding security schemes for further details.

In step 61 terminal A 27 sends the data signal to terminal B 29 along with one or more identification variable values. Alternatively, the one or more identification variable values are transmitted separately from the transmission signal. However, recovery of the confidential communication information may only occur once terminal B 29 has received the time-variable values. The data signal and the one or more identification variable values may be transmitted in any order, or they may be transmitted simultaneously.

In step 63 terminal B 29 receives the data signal along with the one or more identification variable values expressed in the coordinate measurement domain adopted by terminal A 27. To recover the confidential communication information from the received data signal, at step 65 the one or more received identification variable values are transformed, using the coordinate transform M, to calculate the identification variable values expressed with respect to terminal B's 29 adopted coordinate measurement domain. The converted identification variable values are subsequently used to identify and recover the confidential communication information comprised within the received data signal at step 67.

At this stage the receiver has recovered the confidential communication information concealed in the data signal, and the process is completed at step 69.

Alternative Embodiments

Now that the basic system and method of the present invention have been described, alternative embodiments are set out below.

As mentioned previously, in alternative embodiments both sender and receiver may share the same coordinate measurement domain. The distinguishing feature between such embodiments and the above described embodiments, is that the coordinate transform function is no longer required to map identification variable values expressed with respect to the sending terminal's coordinate measurement domain, to values expressed with respect to the receiving terminal's coordinate measurement domain. The identification variable values are transmitted to the receiving terminal expressed with respect to the shared coordinate measurement domain. The security and confidentiality of the transmitted data signal is maintained provided that the shared coordinate measurement domain remains confidential. In this way, an eavesdropper cannot effectively use the intercepted identification variable values to extract the communication information from the intercepted data signal. An eavesdropper requires knowledge of the shared coordinate measurement domain to effectively use the intercepted identification variable values for the purposes of extracting the communication information.

The present system and method may be used to securely transmit information to a plurality of receiving terminals 5, 7, 9, 11 as illustrated in FIG. 1. Each receiving terminal 5, 7, 9, 11 adopts a different confidential coordinate measurement domain, which is unknown to the other terminals. Selected information may be transmitted to the plurality of receiving terminals 5, 7, 9, 11 using a single transmission signal. A plurality of confidential communication information is encoded within the data signal. The plurality of confidential communication information is comprised of individual confidential communication information components each associated with a different intended receiving terminal 5, 7, 9, 11.

The sending terminal 3 is provided with a plurality of coordinate transform functions, each function associated with a different receiver terminal 5, 7, 9, 11. The sending terminal 3 determines the identification variable values associated with each different confidential communication information component and uses the known coordinate transform functions to express the identification variable values in the coordinate measurement domain adopted by the intended receiving terminal. The sending terminal 3 is now in possession of the identification variable values associated with each different confidential communication information component and expressed in the coordinate measurement domain of the intended receiving terminal. An optional identifier may be appended to each one of the plurality of identification variable values. The identifier, which may relate to a binary string appended to the identifier variable values, enables the receiver terminals 5, 7, 9, 11 identify which one of the plurality of identifier variable values is applicable to them. In other words, the identifier tells the receiver terminal which one of the plurality of identifier variable values is expressed in its adopted coordinate measurement domain.

The identifier does not compromise the security of the system, since it does not reveal information regarding the coordinate measurement domain adopted by the intended receiver to a malevolent third party.

The data signal and the plurality of identification variable values are sent to each receiving terminal 5, 7, 9, 11 along with the associated identifiers. Upon receipt of the data signal, the identification variable values and the associated identifiers, a receiving terminal 5, 7, 9, 11 will first identify the identification variable values associated with its selected coordinate measurement domain. Once it has identified the variable values associated with its selected coordinate measurement domain, the confidential communication information intended for the subject receiving terminal may be extracted from the received data signal.

It is to be appreciated that a receiving terminal 5, 7, 9, 11 may only extract confidential communication information from the data signal that was intended for it. For example, receiving terminal 5 cannot extract confidential communication information intended for terminal 7, since terminal 5 does not know the coordinate measurement domain adopted by terminal 7. Therefore, even though terminal 5 may be able to identify the identification variable values associated with the confidential communication information intended for terminal 7, to correctly extract the confidential communication information intended for terminal 7, the variable values and the coordinate measurement domain with respect to which they are expressed (i.e. the measurement system adopted by terminal 7), must be known. In other words, terminal 5 cannot correctly apply the identification variable values to extract the confidential communication information intended for terminal 7, without knowledge of the coordinate measurement domain with respect to which the identification variable values have been expressed. Accordingly, the method and system of the present invention lends itself for use in securely transmitting a plurality of different communication information concealed in a single data signal, to different intended recipients, without compromising the confidentiality of the different communication information.

In a further alternative embodiment of the present invention, the Lorentz transforms of special relativity may be used, which are defined as follows:

$$t' = \gamma\left(t - \frac{vx}{c^2}\right)$$

$$x' = \gamma(x - vt)$$

$$y' = y$$

$$z' = z$$

$$\gamma = \frac{1}{\left(1 - \left(\frac{v}{c}\right)^2\right)^{\frac{1}{2}}}$$

The above transforms have their conventional meaning, and the interested reader is referred to any University Physics textbook with a chapter on Relativistic Mechanics, for a more thorough definition of the above transform equations. For present purposes, it suffices to note that the Lorentz transforms describe the spatial and temporal coordinate transforms between two inertial (constant velocity) frames of reference, moving at constant velocity with respect to one another.

An example of how the Lorentz transforms may be used is set out in the following alternative embodiment. Terminals A 27 and B 29 both select fictional coordinate measurement frames, one of which moving at close to the speed of light such that relativistic effects, such as time dilation, become noticeable. This is an important requirement since the premise of this embodiment is that both terminal A 27 and terminal B 29 will observe different time-coordinate values, which is only possible when relativistic effects become significant and result in a deviation from classical Newtonian Mechanics. For example, terminal A 29 may select to express its time-coordinate variable values t with respect to an inertial frame of reference moving at 0.992 c, where c is the speed of light (approximately $3 \times 10^6$ ms$^{-1}$). To determine the identification variable value as measured in its own coordinate measurement frame, terminal B 29 applies the appropriate Lorentz transform—in this case the transform for t' however, any other Lorentz transform could equally be used.

Once the time-coordinate variable value has been calculated in the frame of reference adopted by terminal B 29, the confidential communication information is recovered as described previously. The skilled addressee will note that use of the Lorentz transforms requires that terminal B 29 is provided with both the identification variable value signal time coordinates associated with the confidential communication information, as measured by terminal A 27, and the fictional velocity of terminal A's 27 selected frame of reference. The velocity of terminal A's 27 selected frame of reference is preferably provided to terminal B 29 at the source of manufacture, prior to data transmission or is provided via a known secure communication channel Knowledge of the velocity of terminal A's 27 fictional relativistic coordinate measurement frame by an eavesdropper may compromise the integrity and security of the transmission signal if the eavesdropper is aware that relativistic coordinate measurement frames are being used, since effectively the fictional velocity defines the relativistic measurement frame. With knowledge of the relativistic measurement frame, an eavesdropper is able to recover the confidential communication information concealed within the intercepted data signal.

In a further alternative embodiment of the present invention, terminal A 27 is provided with a clock measuring time at irregular intervals, or in accordance with a selected algorithm. The irregular clock is used to define the time-variable coordinate values associated with the confidential communication information, comprised within the transmitted data signal. Again, terminal B 29 is provided with a coordinate transform function enabling the received identification variable time-values to be expressed in terms of the temporal coordinate frame adopted by terminal B 29—or in other words, terminal B is provided with the transform function required to express the received time-coordinate values with respect to the time-coordinates associated with its own clock.

Alternatively, both sender and receiver may use clocks having different base time-interval units. Provided the receiver is in possession of the appropriate coordinate transform function, time-intervals measured in the sender's temporal coordinate frame (i.e. the adopted coordinate measurement domain), may be re-expressed in the receiver's temporal coordinate frame. For example, the coordinate transform function may simply comprise a coordinate shift.

Figure 5:
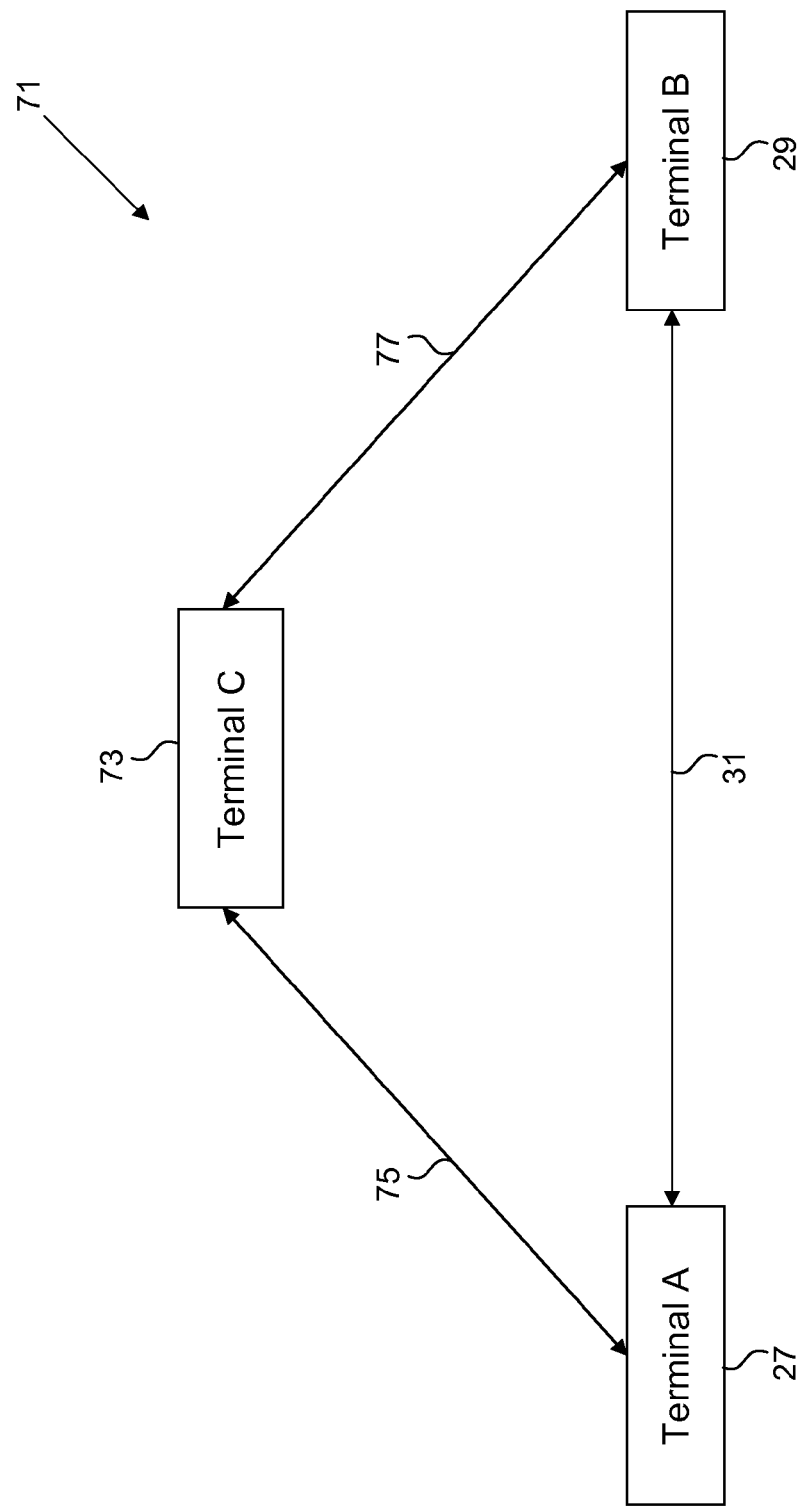
FIG. 5 is a schematic of an alternative transmission system comprising a third secure terminal C.

In a further alternative embodiment, a third secure terminal may be incorporated into the transmission system, and is used as a proxy terminal to distribute the identification variables expressed in the receiver's coordinate measurement domain. FIG. 5 is a schematic diagram illustrating an example of such a system 71. Terminal A 27 (sender) and terminal B 29 (receiver) are operatively connected via a shared communication channel 31 as previously described in relation to FIG. 2. Terminal C 73 (the proxy terminal) is operatively connected to both terminals A 27 and B 29 via, respectively shared communication channel 75 and shared communication channel 77. The difference between the present embodiment and previously described embodiments is that neither terminal A 27 or terminal B 29 is provided with the coordinate transform function M required to express the identification variable values in the receiving terminal's measurement frame. Instead, terminal C is provided with this information. In other words, terminal C is provided with the coordinate transform function M required to convert identification variable values expressed with respect to terminal A's 27 coordinate measurement domain into variable values expressed with respect to terminal B's 29 coordinate measurement domain. Alternatively, terminal C 73 may be provided with the coordinate measurement domain of terminal A 27 and terminal B 29. In this way, terminal C 73 can calculate the coordinate transform function M when it is required.

Furthermore, terminal C 73 shares a different pair of unique encryption keys with each attached terminal. For example, terminal C 73 shares an encryption key pair with terminal B 29, which is different to the encryption key pair shared with terminal A 27. The encryption key pairs may relate to a public-key encryption pair, wherein one key is publicly available and is used to encrypt information, whereas the private key used to decrypt encrypted information is known only to terminal C 73. It is immaterial for present purposes which type of cryptographic keys are shared between the terminals, suffice to say that the encryption keys must be sufficiently complex to ensure that a malicious third party and/or eavesdropper is not able to derive the decryption key from knowledge of the encryption key. One way of achieving this, and as will be known to the skilled reader, the encryption function is selected such that its inverse is not well defined. This ensures that an eavesdropper cannot derive the decryption key from knowledge of the encryption key. Public-key cryptography is one example of a widely known cryptographic protocol which satisfies this requirement however, other types of cryptographic protocols exist which also satisfy this requirement and may equally be used with the present invention.

Preferably, terminal C is configured with knowledge of the coordinate measurement domains of terminals A 27 and B 29 at the point of manufacture. Similarly, the encryption keys are also preferably distributed at the point of manufacture and prior to data transmission. In the ensuring description the cryptographic key pairs shared between terminal C 73 and terminal A 27 are denoted eA, and similarly the cryptographic key pairs shared between terminal C 73 and terminal B 29 are denoted eB. The encryption key is further denoted by a 1 subscript, for example eA1 denotes the encryption key member of the key pair shared between terminal C 73 and terminal A 27. Similarly, eA2 denotes the decryption key member of the key pair shared between terminal C 73 and terminal A 27.

Figure 6:
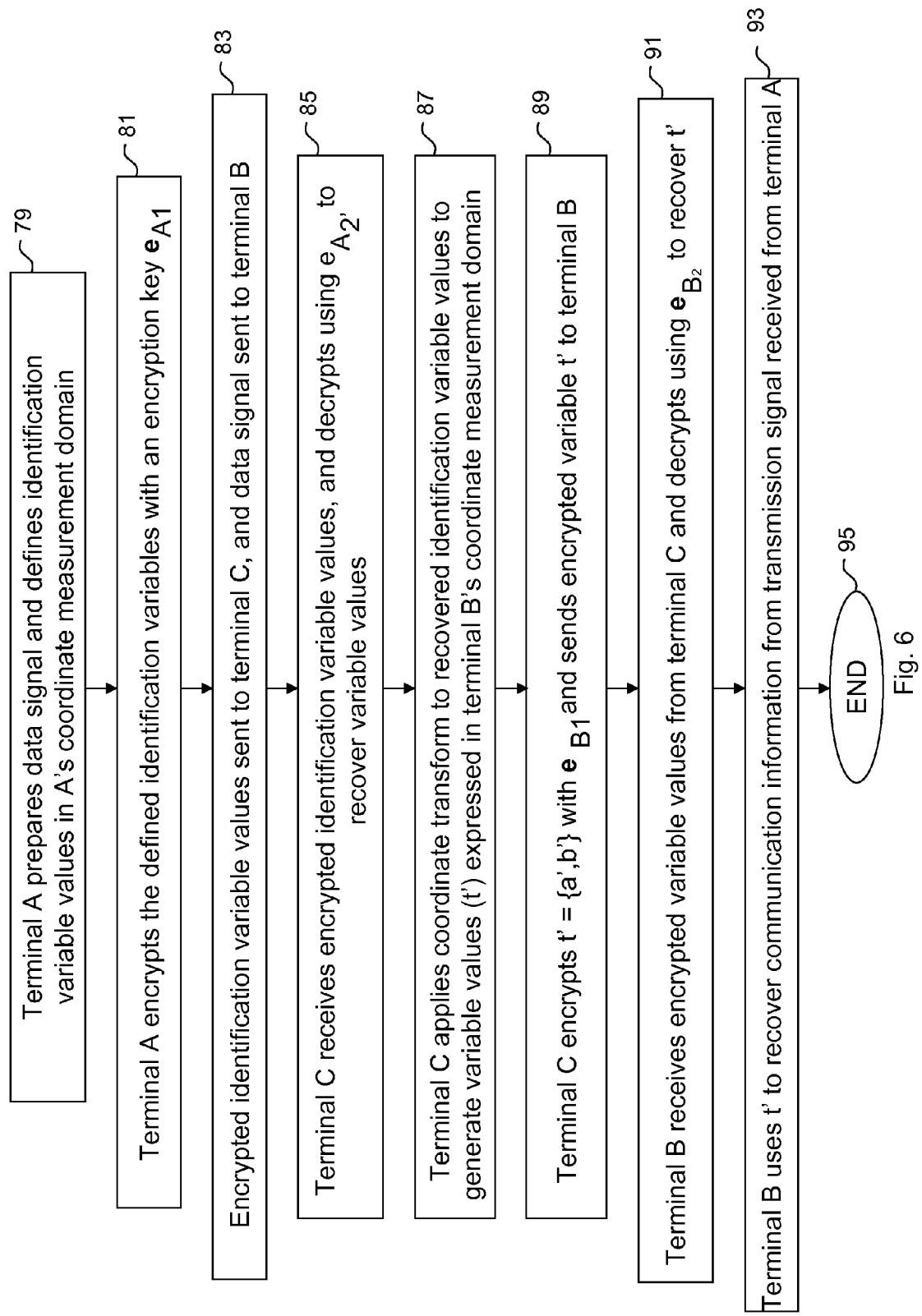
FIG. 6 is a process flow chart outlining the method carried out by the system of FIG. 5.

An example of the present embodiment is now described with reference to the flow chart illustrated in FIG. 6. Terminals A 27, B 29 and C 73 are remotely located with respect to each other. Terminal C 73 is located in a secure and trusted location. Accordingly, for present purposes it is assumed that the integrity and confidentiality of the information stored at terminal C 73 is secure. In step 79, terminal A prepares a data signal, as previously described and defines the identification variable values t={a,b} required to extract the confidential communication information concealed in the data signal f(t). Terminal A 27 subsequently encrypts the defined identification variable values t={a,b} using the encryption key eA1 in step 81.

The encrypted identification variable values, denoted eA1[t={a,b}], are sent to terminal C 73 in step 83. Optionally, the data signal f(t) may simultaneously be sent to terminal B 29. However, terminal B 29 will only be able to recover the concealed confidential communication information once it has received the identification variable values t'={a',b'}, expressed with respect to its adopted coordinate measurement domain from terminal C 73. Accordingly, it is equally possible to transmit the data signal f(t) after step 91, once terminal B 29 has received the identification variable values from terminal C 73.

Terminal C 73 receives the encrypted identification variable values eA1[t={a,b}] in step 85. Terminal C 73 decrypts the received variable values using its decryption key eA2, to recover the identification variable values t={a,b}. The recovered identification variable values t={a,b} are subsequently converted by terminal C 73 to identification variable values t'={a',b'} in terminal B's 29 coordinate measurement domain, using the coordinate transform function M in step 87.

In step 89 terminal C 73 encrypts the identification variable values t'={a',b'} using the encryption key member eB1 of the cryptographic key pair shared with terminal B 29. The encrypted identification variable values eB1[t'={a',b'}] are subsequently sent to terminal B 29.

Terminal B 29 received the encrypted identification variable values eB1[t'={a',b'}] from terminal C 73 in step 91, and decrypts the received encrypted identification variable values eB1[t'={a',b'}] using the decryption key member eB2 to recover the identification variable values t'={a',b'}.

The decrypted identification variable values t'={a',b'} expressed with respect to terminal B's 29 selected measurement frame, are used by terminal B 29 to extract the confidential communication information concealed in the received data signal, which ends the process in step 95.

It is to be appreciated that the system and method of the above described embodiment is secure against eavesdroppers, since without knowledge of the decryption key eB2 and the coordinate measurement domain of terminal B 29, the eavesdropper cannot accurately extract the confidential communication information from the data signal.

In all described embodiments, security of transmission is maintained since an eavesdropper does not possess sufficient information to allow an intercepted identification variable value to be re-expressed in terms of its own coordinate measurement domain. Accordingly, an eavesdropper can not identify and recover the confidential communication information within an intercepted data signal with any degree of certainty.

The herein described system and methods may be used in conjunction with any existing cryptographic protocol for an added layer of security. Similarly, the identification variable values and/or the data signal may be encrypted prior to transmission. For example, the confidential communication information may be encrypted and embedded in encrypted form in the data signal. Similarly, the identification variable values may be encrypted, and transferred to the receiving terminal in encrypted form. In this way, an eavesdropper must obtain the decryption key, in addition to knowing the receiver's coordinate measurement domain to be able to extract the confidential communication information from the data signal.

It is to be appreciated that the present method may be used with any type of data and any type of digital file format. Including voice-over-IP (VoIP), audio data files (e.g. mp3, mp4, WAV, flac etc.), video data files (e.g. avi, mpeg etc.), image data files (e.g. jpeg, RAW etc.), and any other data file formats.

It is to be appreciated that the term terminal, as used in the present description relates to any electronic device capable of receiving and transmitting data signals. For example, this includes but is not limited to a PC, a mobile telephone, a smart telephone, a telephone, a modem, a Portable Data Assistant (PDA) etc.

Although the herein described embodiments relate to one-way communications—namely, information is sent in one direction, from a sender (i.e. terminal A 27) to a receiver (i.e. terminal B 29), the herein described methods may equally be used for two-way communication, in which case each terminal is both a receiver and a sender of confidential communication information—e.g. terminal B 29 transmits information to terminal A 27.

The herein described embodiments are provided for illustrative purposes only and are not limiting. Furthermore, alternative embodiments related to any combination of the herein described embodiments are envisaged and fall within the scope of the present invention.

The present invention may be used in conjunction or independently from known cryptographic methods.

Further features of the present invention are set out in the following clauses:

A data terminal for securely transmitting communication information to a remotely located second terminal, the data terminal comprising: combining means, for combining the communication information with extraneous information to create a data signal; determining means, for determining a value of an identification variable expressed with respect to a first coordinate measurement domain, the identification variable value enabling the location of the communication information concealed within the data signal to be determined; and a transmitter for transmitting the data signal and the identification variable value to the second terminal.

The terminal may comprise: a mapping means, for using a coordinate transform function configured to map coordinate values from the first coordinate measurement domain to a second coordinate measurement domain to calculate a value of the identification variable expressed with respect to the second coordinate measurement domain.

Alternatively, the data terminal may be arranged to operate in the first coordinate measurement domain.

The data terminal of may comprise: encryption means, for encrypting the identification variable value using a cryptographic key shared with a receiving terminal to thereby improve the confidentiality of the transmitted identification variable value.

The encryption means may be configured to encrypt the data signal to thereby improve the confidentiality of the transmitted data signal.

The encryption means may be configured with one of the keys comprised in a public cryptographic key pair.

The combining means may comprise an algorithm generator, configured to generate an algorithm for combining the communication information with the extraneous information.

The algorithm generator may be configured to generate a random algorithm such that the communication information and the extraneous information is combined randomly.

The combining means may comprise a signal modulator configured to modulate a carrier signal with the combined communication information and extraneous information to create the data signal.

The combining means may comprise a signal generator arranged to generate the carrier signal.

A data terminal for securely receiving communication information (referred to as a receiving terminal) from a remotely located transmitting terminal, the data terminal comprising: a receiver, for receiving a data signal comprising the communication information combined with extraneous information, and for receiving a value of an identification variable enabling the location of the communication information within the data signal to be determined; and a demodulator, for extracting the combined communication and extraneous information from the received data signal.

The receiving terminal may comprise: data storage means; and wherein the demodulator is a computer executable code stored in the data storage means.

The receiving data terminal may comprise: information distinguishing means, for distinguishing the communication information from the extraneous information using the identification variable value.

The receiving data terminal may comprise: information extraction means, for extracting the communication information from the extraneous information using the identification variable value.

The receiving data terminal may comprise: a mapping means, for using a coordinate transform function configured to map coordinate values from a first coordinate measurement domain to a second coordinate measurement domain to calculate a value of the identification variable expressed with respect to the second coordinate measurement domain.

The receiving data terminal may be arranged to operate in the second coordinate measurement domain.

The receiving data terminal may comprise: decryption means, for decrypting an encrypted identification variable value using a cryptographic key shared with the transmitting terminal.

The decryption means may be configured to decrypt an encrypted data signal received from the transmitting terminal.

The decryption means may be configured with one of the keys comprised in a public cryptographic key pair.

The receiving data terminal may be a computer terminal.

The receiving data terminal may be a mobile telephone.

The receiving data terminal may be a smartphone.

The invention claimed is:

1. A computer-implemented method of securely transmitting communication information over an insecure communications channel from a first terminal operating in a first coordinate measurement domain to a second remotely-located receiving terminal operating in a second coordinate measurement domain, the communication information relating to information defined by a user for communication to the second remotely-located receiving terminal, the method comprising:
   selecting extraneous information for use in creating a data signal, the extraneous information relating to information that does not form a part of the information defined by the user;
   prior to transmission of the communication information from the first terminal, combining, with a processor of the first terminal, the communication information with the extraneous information to create the data signal, the communication information being concealed with the extraneous information within the data signal;
   determining, with the processor of the first terminal, a value of an identification variable expressed with respect to the first coordinate measurement domain, the value of the identification variable enabling a location of the communication information concealed within the data signal to be determined;
   transmitting the data signal and the value of the identification variable from the first terminal to the second remotely-located receiving terminal;
   using a coordinate transform function configured to map coordinate values from the first coordinate measurement domain to the second coordinate measurement domain to calculate a value of the received identification variable expressed with respect to the second coordinate measurement domain; and
   extracting the communication information from the received data signal using the value of the calculated identification variable to distinguish the communication information from the extraneous information;
   wherein the first terminal is provided with the coordinate transform function and uses the coordinate transform function prior to transmitting the data signal;
   the communication information is transmitted to the second receiving terminal operating in the second coordinate measurement domain and to a third receiving terminal operating in a third coordinate measurement domain;
   the second coordinate measurement domain is associated with the first coordinate measurement domain by a first coordinate transform function;
   the third coordinate measurement domain is associated with the first coordinate measurement domain by a second coordinate transform function;
   the first coordinate transform function is used to calculate a value of the identification variable expressed with respect to the second measurement domain; and
   the second coordinate transform function is used to calculate a value of the identification variable expressed with respect to the third coordinate measurement domain.

2. The method of claim 1, wherein the identification variable comprises a receiving terminal identifier, the identifier being indicative of the receiving terminal coordinate measurement domain the value of the identification variable is expressed with respect to.

3. The method of claim 2, wherein at each receiving terminal extracting the communication information comprises:
   identifying the value of the identification variable expressed with respect to the receiving terminal's coordinate measurement domain using the terminal identifier, and using the value of the identification variable to extract the communication information from the received data signal.

4. The method of claim 3, wherein the data signal comprises first and second communication information, and extracting the communication information from the received data signal comprises:
   extracting the first communication information at the second receiving terminal using a first value of the identification variable calculated using the first coordinate transform function, the first value of the identification variable having been identified on the basis of a first terminal identifier associated with the second receiving terminal; and
   extracting the second communication information at the third receiving terminal using a second value of the identification variable calculated using the second coordinate transform function, the second value of the identification variable having been identified on the basis of a second identifier associated with the third receiving terminal.

5. The method of claim 1, wherein transmitting the data signal comprises transmitting the value of the identification variable from the first terminal to the second remotely-located receiving terminal via a third terminal.

6. The method of claim 5, wherein the third terminal is provided with the coordinate transform function, and the method further comprises:
   encrypting, at the first terminal, the value of the identification variable using a first cryptographic key shared with the third terminal, and transmitting the encrypted identification variable to the third terminal;
   decrypting, at the third terminal, the received encrypted identification variable prior to using the coordinate transform function; and
   encrypting the value of the identification variable expressed with respect to the second coordinate measurement domain, using a second cryptographic key shared with the second remotely-located receiving terminal, and transmitting the encrypted identification variable to the second receiving terminal for extracting the communication information from the received data signal.

7. The method of claim 6, wherein extracting the communication information from the received data signal comprises decrypting, at the second receiving terminal, the received encrypted value of the identification variable using the second cryptographic key, and using the decrypted value of the identification variable to distinguish the communication information from the extraneous information.

8. The method of claim 6, wherein the data signal and the value of the identification variable are transmitted separately or simultaneously.

9. The method of claim 8, wherein the data signal is transmitted from the first terminal directly to the second receiving terminal.

10. The method of claim 6, wherein the first and second cryptographic keys are different public key pairs.

11. The method of claim 1, wherein the coordinate measurement domains associated with the first and second terminals, relate respectively to different Lorentzian coordinate frames of reference.

12. The method of claim 1, wherein the identification variable is a time variable.

13. The method of claim 1, wherein combining the communication information with the extraneous information comprises combining the communication information with the extraneous information in accordance with an algorithm.

14. The method of claim 13, wherein the value of the identification variable comprises a randomly-generated algorithm.

15. A system for securely transmitting communication information over an insecure communications channel from a first terminal operating in a first coordinate measurement domain to a second remotely-located receiving terminal operating in a second coordinate measurement domain, the communication information relating to information defined by a user for communication to the second remotely-located receiving terminal, the system comprising:
   a processor provided at the first terminal and configured to:
   combine the communication information with extraneous information prior to transmission of the communication information from the first terminal, to create the data signal, the extraneous information relating to information that does not form part of the information defined by the user, the communication information being concealed with the extraneous information within the data signal; and
   determine a value of an identification variable expressed with respect to the first coordinate measurement domain, the value of the identification variable enabling a location of the communication information concealed within the data signal to be determined;
   a transmitter for transmitting the data signal and the value of the identification variable from the first terminal to the second remotely-located receiving terminal;
   a processor provided at the second remotely-located receiving terminal and configured to:
   calculate a value of the received identification variable expressed with respect to the second coordinate measurement domain using a coordinate transform function configured to map coordinate values from the first coordinate measurement domain to the second coordinate measurement domain; and
   extract the communication information from the received data signal using the calculated value of the identification variable to distinguish the communication information from the extraneous information;
   wherein the first terminal is arranged to calculate a value of the identification variable expressed with respect to the second coordinate measurement domain, and the system further comprises:
   a third receiving terminal operating in a third coordinate measurement domain, wherein the first terminal is arranged to calculate a value of the identification variable expressed with respect to the third coordinate measurement domain; and wherein:
   the second coordinate measurement domain is associated with the first coordinate measurement domain by a first coordinate transform function;
   the third coordinate measurement domain is associated with the first coordinate measurement domain by a second coordinate transform function;
   the first coordinate transform function is used to calculate a value of the identification variable expressed with respect to the second measurement domain; and
   the second coordinate transform function is used to calculate a value of the identification variable expressed with respect to the third coordinate measurement domain.

16. The system of claim 15, wherein each one of the second and third receiving terminals is arranged to identify the value of the identification variable expressed with respect to its own coordinate measurement domain on the basis of a terminal identifier associated with the value of the identification variable, the terminal identifier being indicative of the terminal coordinate measurement domain the value of the identification variable is expressed with respect to.

17. The system of claim 16, wherein each receiving terminal is arranged to use the value of the identification variable to extract the communication information from the received data signal using the value of the identification variable to distinguish the communication information from the extraneous information.

18. The system of claim 15, wherein the transmitter is arranged to transmit the value of the identification variable from the first terminal to the second receiving terminal via a third terminal.

19. The system of claim 18, wherein
   the processor of the first terminal is configured to encrypt the value of the identification variable using a first cryptographic key shared by the first terminal with the third terminal;
   a processor of the third terminal is configured to:
   decrypt the received encrypted identification variable using the shared first cryptographic key, processor, coupled to the memory and to the network port, the processor configured to perform actions including:

encrypt the value of the identification variable expressed with respect to the second coordinate measurement domain, using a second cryptographic key shared with the second receiving terminal, and transmit the encrypted identification variable to the second receiving terminal.

20. The system of claim 19, wherein the processor of the second receiving terminal is configured to decrypt the received encrypted value of the identification variable using the second cryptographic key.

21. The system of claim 15, wherein the transmitter is arranged to transmit the value of the identification variable expressed with respect to the first coordinate measurement domain.

22. A data terminal for securely transmitting communication information over an insecure communications channel to a remotely-located receiving terminal, the communication information relating to information defined by a user for communication to the remotely-located receiving terminal, the data terminal comprising:

a processor configured to:

combine the communication information with extraneous information to create a data signal, the extraneous information relating to information that does not form part of the information defined by the user, the communication information being concealed with the extraneous information; and determine a value of an identification variable expressed with respect to a confidential coordinate measurement domain, the value of the identification variable enabling a location of the communication information concealed within the data signal to be determined; and a transmitter for transmitting the data signal and the value of the identification variable to the remotely-located receiving terminal.

* * * * *